(12) United States Patent
Warshawsky

(10) Patent No.: US 7,775,450 B2
(45) Date of Patent: Aug. 17, 2010

(54) THERMOSTATIC MIXING VALVE FOR VERTICAL MOUNTING UPON A HORIZONTAL BATHTUB DECK

(76) Inventor: Jerome Warshawsky, 19 Faulkner La., Dix Hills, NY (US) 11746

( * ) Notice: Subject to any disclaimer, the term of this patent is extended or adjusted under 35 U.S.C. 154(b) by 527 days.

(21) Appl. No.: 11/606,606

(22) Filed: Nov. 30, 2006

(65) Prior Publication Data

US 2008/0128522 A1    Jun. 5, 2008

(51) Int. Cl.
*G05D 23/185* (2006.01)
*G05D 23/13* (2006.01)
*G05D 23/00* (2006.01)
*G05D 23/02* (2006.01)
*E03C 1/04* (2006.01)

(52) U.S. Cl. ............... 236/12.11; 236/12.18; 236/94; 236/99 R; 4/675; 4/676; 4/677; 4/678

(58) Field of Classification Search ............. 236/12.11, 236/12.18, 94, 99 R; 4/675–678
See application file for complete search history.

(56) References Cited

U.S. PATENT DOCUMENTS

| | | | | |
|---|---|---|---|---|
| 2,523,493 A | * | 9/1950 | Bizak | ............ 236/12.11 |
| 2,893,637 A | * | 7/1959 | Trubert | ............ 236/12.11 |
| 4,662,389 A | * | 5/1987 | Igbal | ............ 137/359 |
| 2004/0065367 A1 | * | 4/2004 | Thomas | ............ 137/359 |

\* cited by examiner

*Primary Examiner*—Frantz F. Jules
*Assistant Examiner*—Travis Ruby
(74) *Attorney, Agent, or Firm*—Alfred M. Walker

(57) ABSTRACT

An adjustable height housing enables a thermostatic mixing valve (TMV) with a dial permitting manual control of bathtub shower water temperature to be vertically mounted in a horizontal bathtub deck. The housing can be installed on a narrow bathtub rim yet also accommodates substantial substrate thickness of bathtub decks where required. Manual adjustment of hot and cold ring stops is performed from the top-side using only a screwdriver to gain access. The housing includes a long threaded outer sleeve which extends from near the top deck surface to the thermostatic mixing valve (TMV) cartridge body housing below, thereby accommodating any deck thickness from a 1/16 inch thick stainless steel tub edge to a compound deck construction up to 2¾ inches thick. The rotatable temperature dial is coupled to a cap rotatable by the adjustment handle which, in turn, rotates an adjustable extension shaft within the housing.

12 Claims, 5 Drawing Sheets

THERMOSTATIC MIXING VALVE FOR VERTICAL MOUNTING UPON A HORIZONTAL BATHTUB DECK

FIELD OF THE INVENTION

The present invention relates to thermostatic valves for vertically extending hand held showers or other faucets mounted in a horizontal bathtub deck.

BACKGROUND OF THE INVENTION

Thermostatic mixing valve (TMV) cartridges are readily available in the plumbing industry. They are inserted in form fitting housings and are usually mounted to a vertical wall in a shower area. Although quite reliable, these valves have adjustments known as ring stops which set the maximum rotation in both the hot and cold setting directions. The adjustments permit accommodation for the supply temperatures and pressures of the hot and cold water supplies. Besides an initial adjustment at installation, any changes that effect the temperature and pressure of the water supplies may call for readjustment. These changes include plumbing changes, seasonal temperature changes, change of a domestic hot water appliance, addition or removal or cleaning of line filters, or even customer preference. These adjustments are accessible from the valve temperature adjustment end on the user side of the vertical wall by simply removing a handle and a cap. This is possible due to the limited predictable thickness of the vertical wall which typically are made of sheet rock with a mastic layer followed by grouted tile. The ring stops can be simply pulled off a fluted shaft and reinstalled in a different position by using one's fingers.

When installing a thermostatic mixing valve (TMV) for a hand held shower or other faucet on a horizontal deck, there are two problems that are not encountered on vertical wall installations. One relates to the wide variation in substrate thickness that can be encountered due to the variety of materials used. Another limitation is the narrow bathtub edge if this is, in fact, the horizontal deck intended for installation. Custom solutions have included installation kits which require large deck openings to permit topside access to thermostatic mixing valve (TMV)'s. Other attempts have used special tools to reach the ring stops installed on thermostatic mixing valve (TMV)'s which are a distance below the deck surface.

There is not a universal thermostatic mixing valve (TMV) which will accommodate a wide variety of deck thicknesses, permit easy hand reachable ring stop adjustment, and is easily installed through a single round hole in even a narrow deck area.

OBJECTS OF THE INVENTION

It is therefore an object of the present invention to provide a universal thermostatic mixing valve (TMV) which will accommodate a wide variety of deck thicknesses, permit easy hand reachable ring stop adjustment, and is easily installed through a single round hole in even a narrow deck area.

It is also an object of the present invention to overcome the disadvantages of the prior art mounting of thermostatic mixing valves (TMV) in horizontal bathtub decks of varying thickness'.

SUMMARY OF THE INVENTION

This invention is a thermostatic mixing valve (TMV) of a hand held shower or other faucet for vertical mounting in a horizontal bathtub deck, which can be installed on a narrow bathtub rim yet also accommodates substantial substrate thickness of bathtub decks where required. It is simply installed through a single round mounting hole. Adjustment of hot and cold ring stops by hand is performed from the top-side using only a screwdriver to gain access.

This is accomplished by creating a thermostatic mixing valve (TMV) housing with a long threaded outer sleeve which extends from near the top deck surface to the thermostatic mixing valve (TMV) cartridge body housing below thereby accommodating any deck thickness from a 1/16 inch thick stainless steel tub edge to a compound deck construction up to 2 3/4 inches thick, or more, up to about five inches in thickness. The limit stop as well as the ring stops themselves are moved from the vicinity of the thermostatic mixing valve (TMV) cartridge to the top-side above the deck surface. This is accomplished with a long limit stop hollow extension from the thermostatic mixing valve (TMV) cartridge concentric with a fluted adjuster extension shaft which also couples to the thermostatic mixing valve (TMV) cartridge below.

The rotatable temperature dial is coupled to a cap rotatable by the adjustment handle which, in turn, rotates the extension shaft. The stationary pointer which permits reading of the dial temperature is itself adjustable in steps via a fluted edge to insure proper alignment in a particular installation.

BRIEF DESCRIPTIONS OF THE DRAWINGS

The present invention can best be understood in connection with the accompanying drawings. It is noted that the invention is not limited to the precise embodiments shown in drawings, in which.

Figure 8:
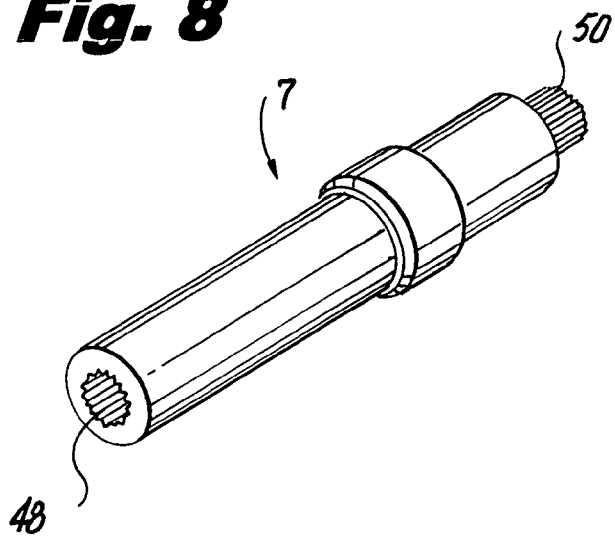
Figure 9:
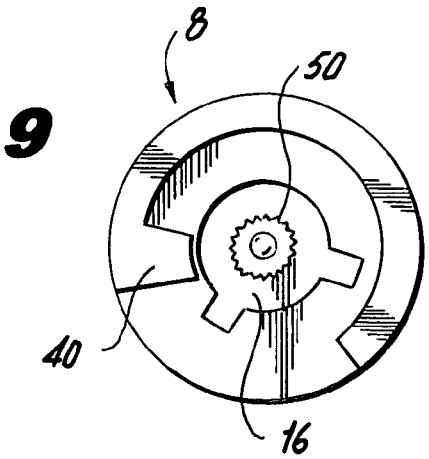
Figure 10:
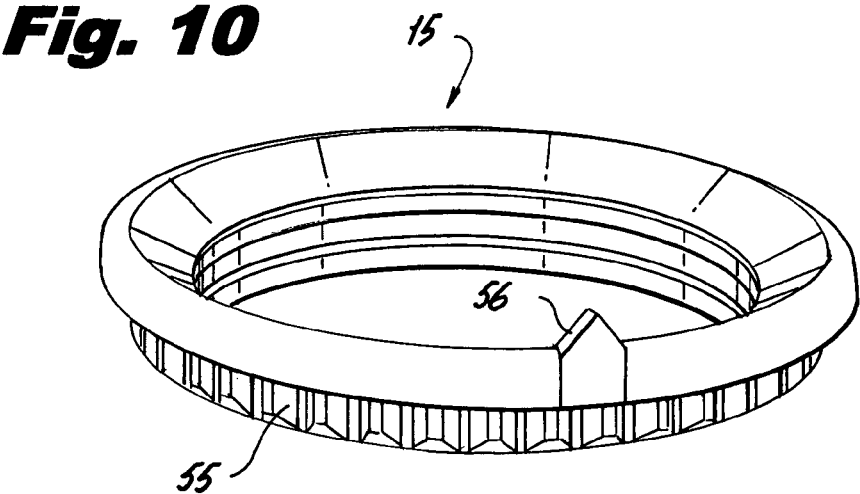

FIG. 8 a perspective view of the extension shaft with female fluted hole at bottom and fluted end extension at top;

FIG. 9 is a top view of limit stop hollow extension with extension shaft centrally installed and two ring stops engaged with the fluted end, and FIG. 10 is a perspective view of the dial pointer insert ring with fluted bottom edge.

DETAILED DESCRIPTION OF THE INVENTION

Figure 1:
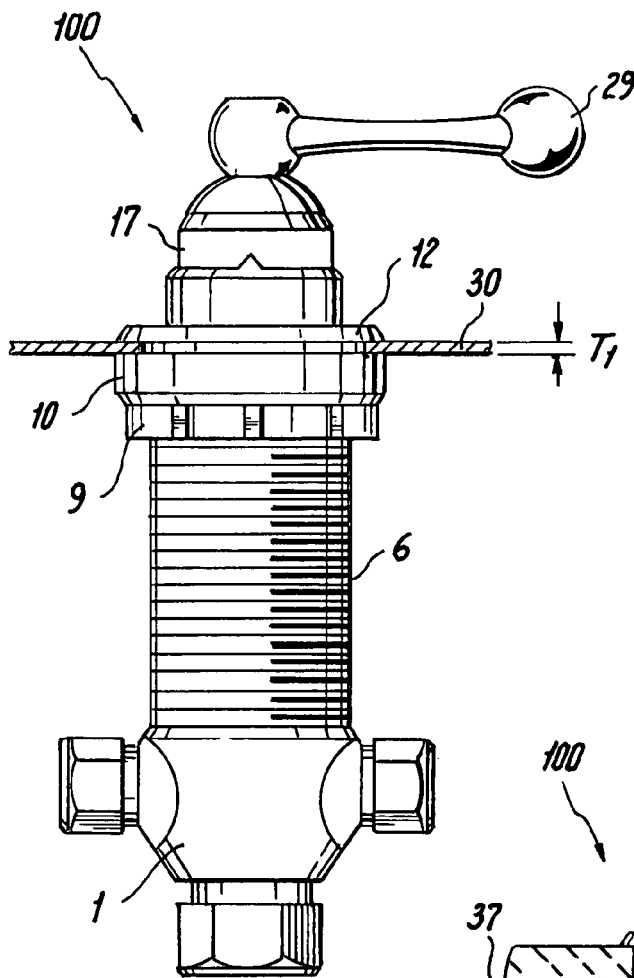
FIG. 1 is a side elevation of the thermostatic mixing valve (TMV) for a hand held shower or other faucet of this invention mounted to a thin metallic deck which is shown in crossection.

Thermostatic mixing valve (TMV) 100 for a hand held shower or other faucet of this invention is shown mounted to a horizontal deck 30 of thickness T1 in FIG. 1. This represents an example of mounting valve 100 to a 1/16 inch thick metal tub edge.

Figure 2:
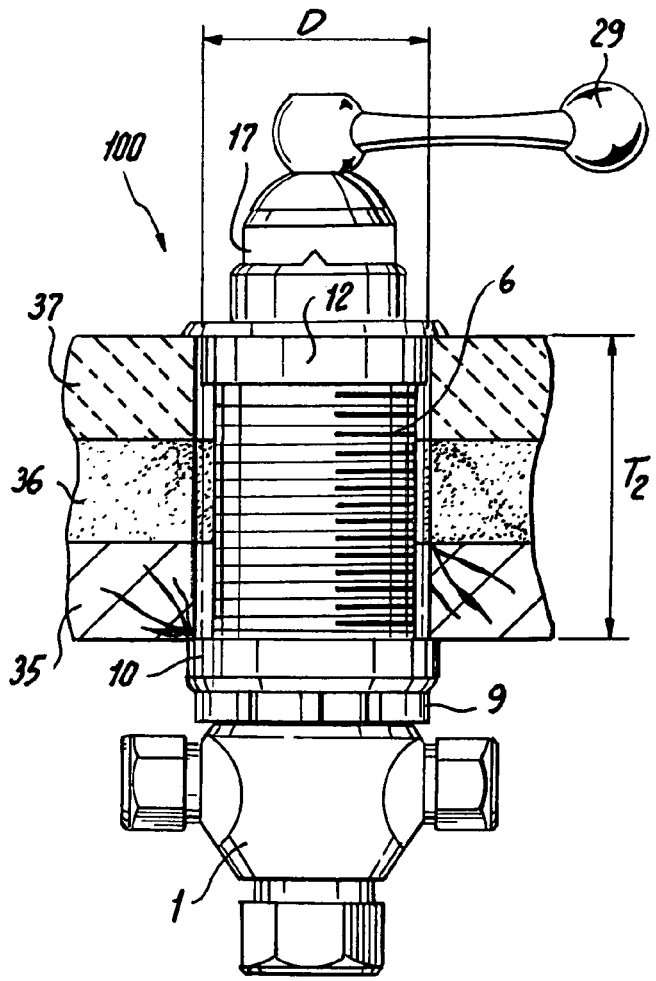
FIG. 2 is a side elevation of the TMV of FIG. 1 mounted on a thick deck consisting of three separate layers of material.

FIG. 2 shows the other thickness extreme T2 where the deck includes bottom plywood layer 35, middle cementitious (mud) layer 36, and a top layer of marble 37. In both cases, the mounting is accomplished the same way. Top hold down nut 12 with integral escutcheon is engaged with threaded outer sleeve 6 through a mounting hole in the substrate that is a clearance fit for diameter D (about 2.5 inches). Optional spacer washer 10, preferably made of compressible material such as plastic, rubber or other suitable material, is forced against the bottom of the deck material by bottom hold down nut 9. Plastic spacer washer 10 is only required for thin decks, such as the where the deck 30 is stainless steel, or where there is considerably less thickness than in decks of multiple layers, such as shown in FIG. 2 depicting plywood layer 35, cementitious layer 36 and decorative upper deck layer 37, such as marble or other suitable bathtub deck material. Therefore use of spacer washer 10 is optional when TMV 100 is installed in thick bathtub decks. Note that the TMV cartridge 4 is housed in thermo body 1. Handle 29 turns dial 17 to adjust the temperature of the output of valve 100.

Figure 3:
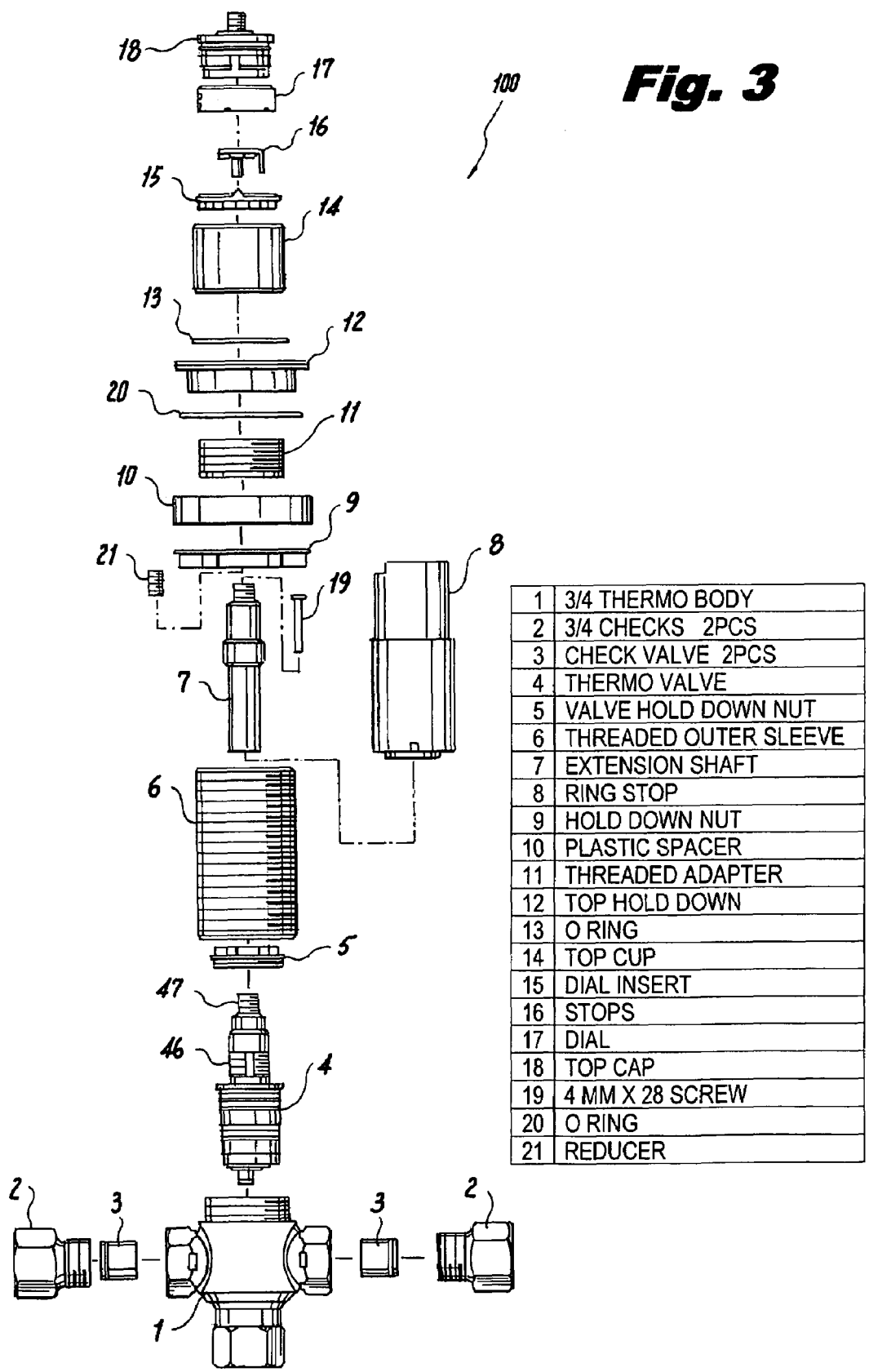
FIG. 3 is a side exploded view of the parts of a TMV of this invention, along with a list naming the parts in the drawing.

FIG. 3 shows an exploded view of all of the parts (except handle 29) forming the components.

Figure 4:
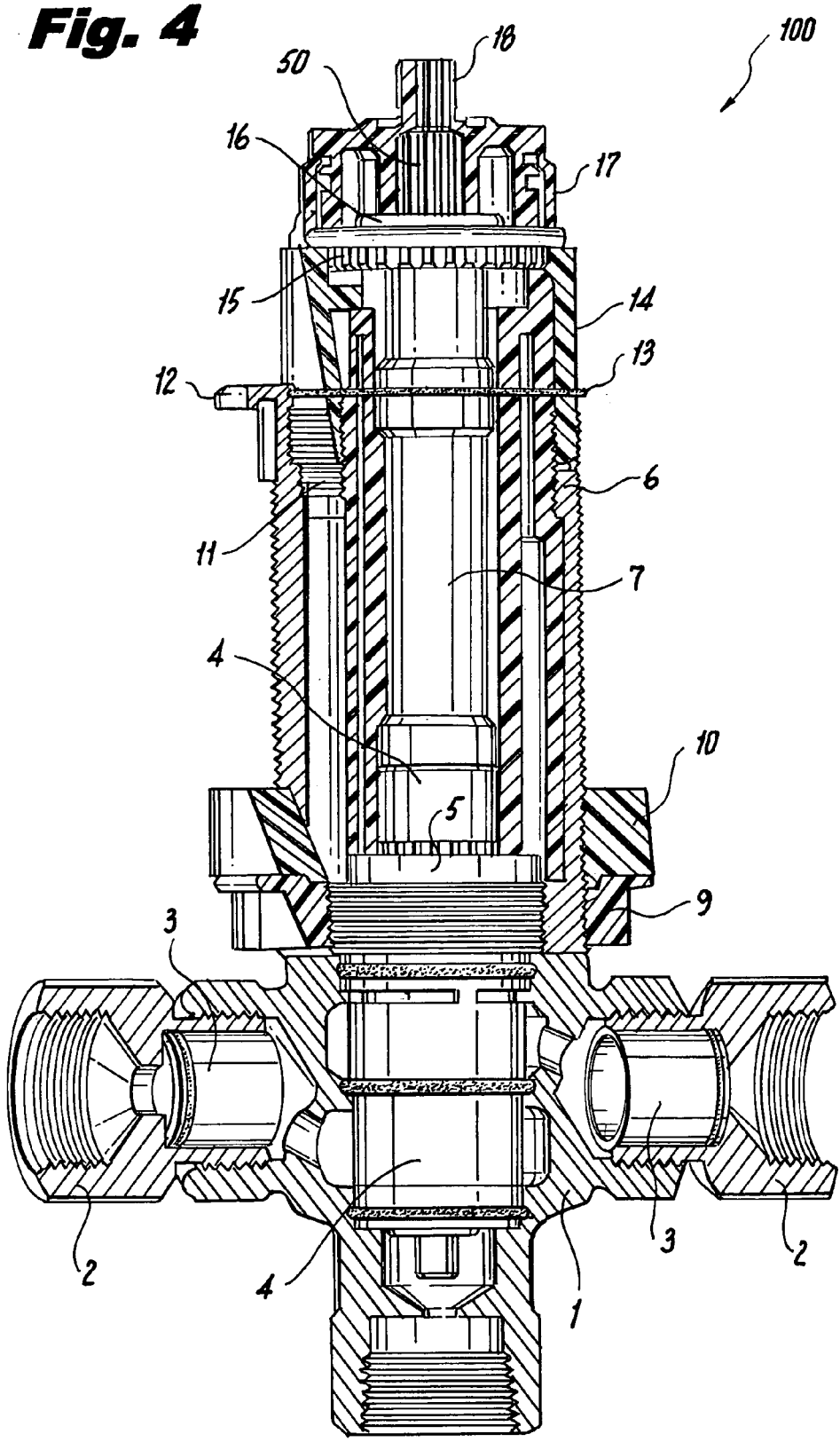
FIG. 4 is a side view in partial crossection of the assembled TMV shown in FIG. 3.

FIG. 4 shows a partial crossection of the same parts assembled. Hot and cold water inlets enter through check valve housings 2 with cartridge check valves 3. Note that mixed water outlet is at the bottom center fitting. The TMV cartridge 4 is housed in thermo body casting 1. Note the fluted body section 46 and the fluted adjustment shaft 47 on TMV cartridge 4.

Several parts shown in FIG. 3 are simply for sealing and to facilitate threaded fastening of the various parts. They will not be described in detail. For example, top cap 18 includes a protrusion at its top, over which is inserted a corresponding female portion of user operable handle 29. A lower end of top cap 18 engages dial 17 with visually perceptible indicia indicating various temperatures set by a pointer 56 attached to annular dial ring 15. Stop 16 engages a top end of ring stop 8, which is inserted within threaded outer sleeve 6 attached at a lower end thereof to a make threaded top end of thermo body 1. Within ring stop 8 there is inserted extension shaft 7 engageable at its lower end with upper fluted adjustment shaft 47 on TMV cartridge 4. An upper end of hollow extension shaft 7 engages screw 19, which descends therein to connect extension shaft 7 to adjustment shaft 47 of TMV cartridge 4. Annular dial ring 16 rests upon an upper end of top cup 14, having an O-ring 13 providing a seal between top cup 14 and top hold down member 12, such as an escutcheon mounted to a horizontal bathtub deck. A further O-ring 20 provides a further seal between top hold down member 12 and optional plastic spacer 10, or directly with hold down nut 9, if optional plastic spacer 15 is not used with a thick horizontal deck, through which vertically mounted TMV 100 is mounted.

Figure 5:
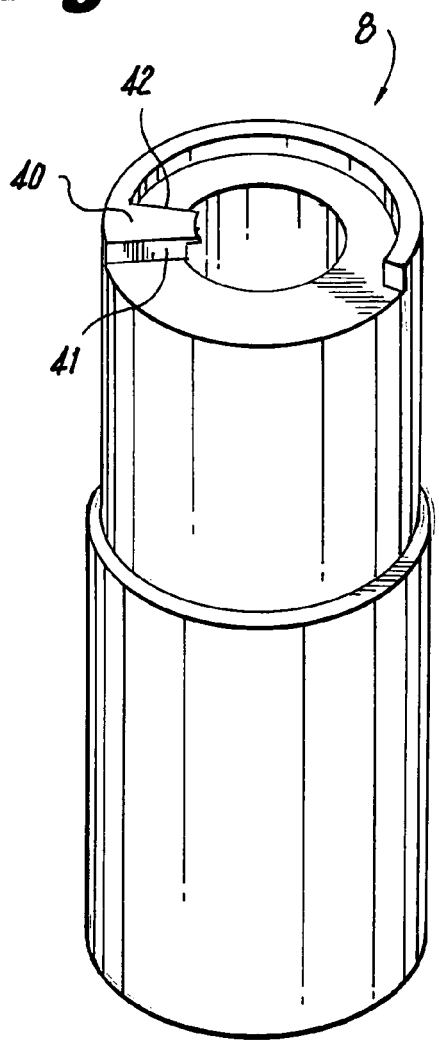
FIG. 5 is a perspective view of the limit stop hollow extension.
Figure 7:
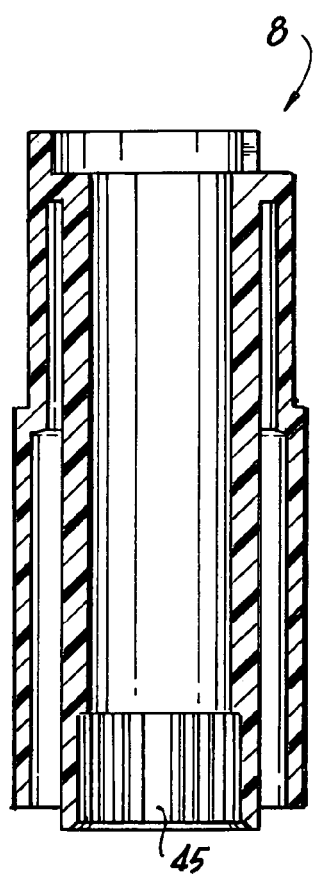
FIG. 7 is a side view crossection of the limit stop of FIG. 5 showing the fluted inside lower end which fits over the fluted upper body of the TMV cartridge.
Figure 6:
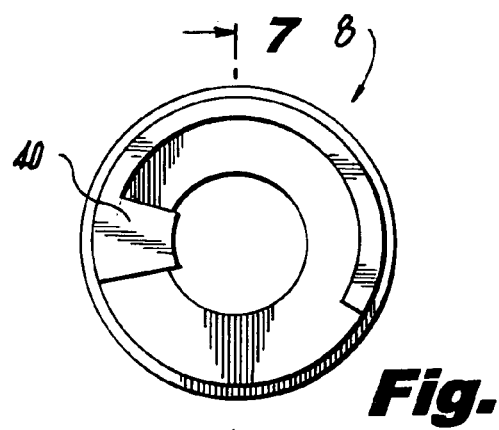
FIG. 6 is a top view of the limit stop of FIG. 5.

FIGS. 5, 6, and 7 show various views of hollow ring stop extension 8 with ring stop protrusion 40, and hot and cold limit stop edges 41 and 42.

In FIG. 7 inner fluted region 45 is shown; it mates with the fluted body region 46 on TMV cartridge 4.

Extension shaft 7 is shown in FIG. 8 with fluted hole 48 at the bottom end and fluted extension 50 at the top. Fluted hole 48 fits over and couples to fluted adjustment shaft 47 on TMV cartridge 4. Screw 19 is inserted within hollow attaches extension shaft 7 and engages a threaded recess within fluted adjustment shaft 47 of TMV cartridge 4, to attach extension shaft 7 to TMV cartridge 4.

FIG. 9 shows the top view of the assembly of ring stop assembly 8, extension shaft 7 and a pair of stacked ring stops 16 coupled with fluted extension 50. Top cap 18 which also carries temperature dial 17 is turned by handle 29; this is also engaged with fluted extension 50 thereby turning fluted adjustment shaft 47 on TMV cartridge 4. Top cup 14 is threaded into adapter 7 so that its exact orientation is unpredictable.

Since dial pointer insert 15 fits into top cup 14, the top edge of cup 14 is fluted internally to receive the fluted bottom edge 55 of dial pointer ring 15 (See FIG. 10). This permits pointer 56 to be radially oriented as appropriate to accurately represent the water outlet temperature on dial 17 from the viewscape of the user.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A thermostatic mixing valve assembly vertically mounted on and extending through a mounting hole in a horizontal top surface of a deck and accommodating a range of thickness of the deck wall comprising:

a valve body having a hot water inlet, a cold water inlet, and an outlet located below said deck;

a thermostatic valve within said valve body controlling inlet flow of hot and cold water for mixing within said valve body;

a rotatable adjustment shaft extending out of said thermostatic valve for adjusting temperature of water discharged through said outlet;

an outer sleeve with a threaded outer surface having a lower end joined to said valve body extending up through said mounting hole and having a throughbore;

a vertically extending extension shaft within said throughbore having one end engaging said adjustment shaft and an opposite end above said top surface of said deck, said opposite end of said extension shaft having a fluted extension;

a stationary ring stop member in said throughbore surrounding said extension shaft, an upper end of said ring stop member having an annular wall with an inwardly extending ring stop protrusion;

a top hold down member having a main body extending into said mounting hole and threadably mounted on an upper end of said outer sleeve and having a shoulder for engaging the top surface of said deck;

a hold down nut threaded on said outer sleeve for clamping against a bottom surface of said deck through a spacer for securing said mixing valve assembly to said horizontal deck;

said spacer having an inner diameter greater than an outer diameter of said main body so that said spacer overlaps said main body of said top hold down member when said deck wall is thinner than length of said main body of said top hold down member, whereby said assembly is mountable on a thin deck wall;

a removable and rotatable top cap mounted on an upper portion of said mixing valve assembly for turning said extension shaft for selecting the temperature of the water leaving said outlet;

a handle attached to said top cap for rotating said top cap for selecting the outlet water temperature; and hot and cold limit stops within said removable top cap for setting a temperature range limiting the temperature selectable by said handle, removal of said top cap allowing convenient adjustment of said hot and cold limit stops to widen or narrow temperature range without accessing said valve assembly below said deck.

2. The valve assembly of claim 1 in which said deck is a bathtub deck.

3. The valve assembly of claim 2 in which a stationary member with a pointer is mounted on said top hold down member and said top cap is engaged with a dial having visual indicia of temperatures for use in selecting a desired outlet water temperature by rotating said handle and top cap.

4. The valve assembly of claim 3 in which the range of thickness of the deck wall is from a 1/16 inch stainless steel tub edge to a compound deck up to about five inches in thickness.

5. The valve assembly of claim 3 in which said hot and cold ring stops include a protrusion on a top end of said stationary ring stop member and stacked ring stops which are rearranged to alter hot and cold temperature limits of said thermostatic mixing valve assembly, opposite sides of said protrusion providing hot and cold limits for rotation of said stacked ring stops.

6. The valve assembly of claim 5 in which the one end of said extension shaft engaging said adjustment shaft is also fluted for engagement with said adjustment shaft allowing easy and convenient disassembly of said valve assembly.

7. A thermostatic mixing valve assembly vertically mounted on and extending through a mounting hole in a horizontal top surface of a deck and accommodating a range of thickness of the deck wall comprising:

a valve body having a hot water inlet, a cold water inlet, and an outlet located below said deck;

a thermostatic valve within said valve body controlling inlet flow of hot and cold water for mixing within said valve body;

an outer sleeve with a threaded outer surface having a lower end joined to said valve body extending up through said mounting hole and having a throughbore;

a top hold down member having a main body extending into said mounting hole and threadably mounted on an upper end of said outer sleeve and having a shoulder for engaging the top surface of said deck;

a hold down nut threaded on said outer sleeve for clamping against a bottom surface of said deck through a spacer for securing said mixing valve assembly to said horizontal deck;

said spacer having an inner diameter greater than an outer diameter of said main body so that said spacer overlaps said main body of said top hold down member when said deck wall is thinner than the length of said main body of said top hold down member, whereby said assembly is mounted on a thin deck wall; and a rotatable adjustment shaft extending out from said thermostatic valve through said outer sleeve and said deck mounting hole for setting a temperature range for water delivered through said thermostatic valve to said outlet.

8. The valve assembly of claim 7 in which said deck is a bathtub deck.

9. The valve assembly of claim 8 in which a stationary member with a pointer mounted on said top hold down member and a top cap is engaged with a dial having visual indicia of temperatures for use in selecting a desired outlet water temperature by rotating said top cap.

10. The valve assembly of claim 9 in which an upper end of said rotatable adjustment shaft has a ring stop protrusion and hot and cold temperature limiting ring stops which are positioned for engagement with said ring stop protrusion for limiting rotation of said extension shaft in both directions of hot and cold of the outlet water temperature, whereby removal of said top cap allows said ring stops to be readily repositioned on said fluted extension to change temperature limits.

11. The valve assembly of claim 10 in which said ring stop protrusion has hot and cold limit stop edges on opposite sides thereof.

12. The valve assembly of claim 11 in which deck thickness of 1/16 inch to about five inches is accommodated.

* * * * *